United States Patent [19]
Brembeck

[11] 3,911,868
[45] Oct. 14, 1975

[54] POULTRY FEEDER
[75] Inventor: Howard S. Brembeck, Goshen, Ind.
[73] Assignee: Chore-Time Equipment, Inc., Milford, Ind.
[22] Filed: July 2, 1974
[21] Appl. No.: 485,096

Related U.S. Application Data
[63] Continuation of Ser. No. 378,652, July 12, 1973, abandoned.

[52] U.S. Cl. .................................................. 119/53
[51] Int. Cl.² ............................................ A01K 5/00
[58] Field of Search...... 119/53, 56 R, 52 R, 52 AF, 119/52 B

[56] References Cited
UNITED STATES PATENTS

| | | |
|---|---|---|
| 3,105,463 | 10/1963 | Pilch ................................ 119/53 X |
| 3,388,690 | 6/1968 | Hostetler ............................ 119/53 |
| 3,408,988 | 11/1968 | Lee ..................................... 119/53 |
| 3,511,215 | 5/1970 | Myers ................................. 119/53 |
| 3,566,843 | 3/1971 | Van Huis ............................. 119/53 |

*Primary Examiner*—J. N. Eskovitz
*Attorney, Agent, or Firm*—Olson, Trexler, Wolters, Bushnell & Fosse, Ltd.

[57] ABSTRACT

A feeder pan for poultry and like animals is provided which discourages or prevents even small birds from climbing bodily into the pan and possibly fouling the feed. A hood member, which can be made of plastic, is provided with a feed storage tube and a surrounding shell member. The terminal edges of the tube and shell form, together with a conical pan bottom, two gates through which feed passes for disposition in a feeding area of limited interior or radial extent.

11 Claims, 12 Drawing Figures

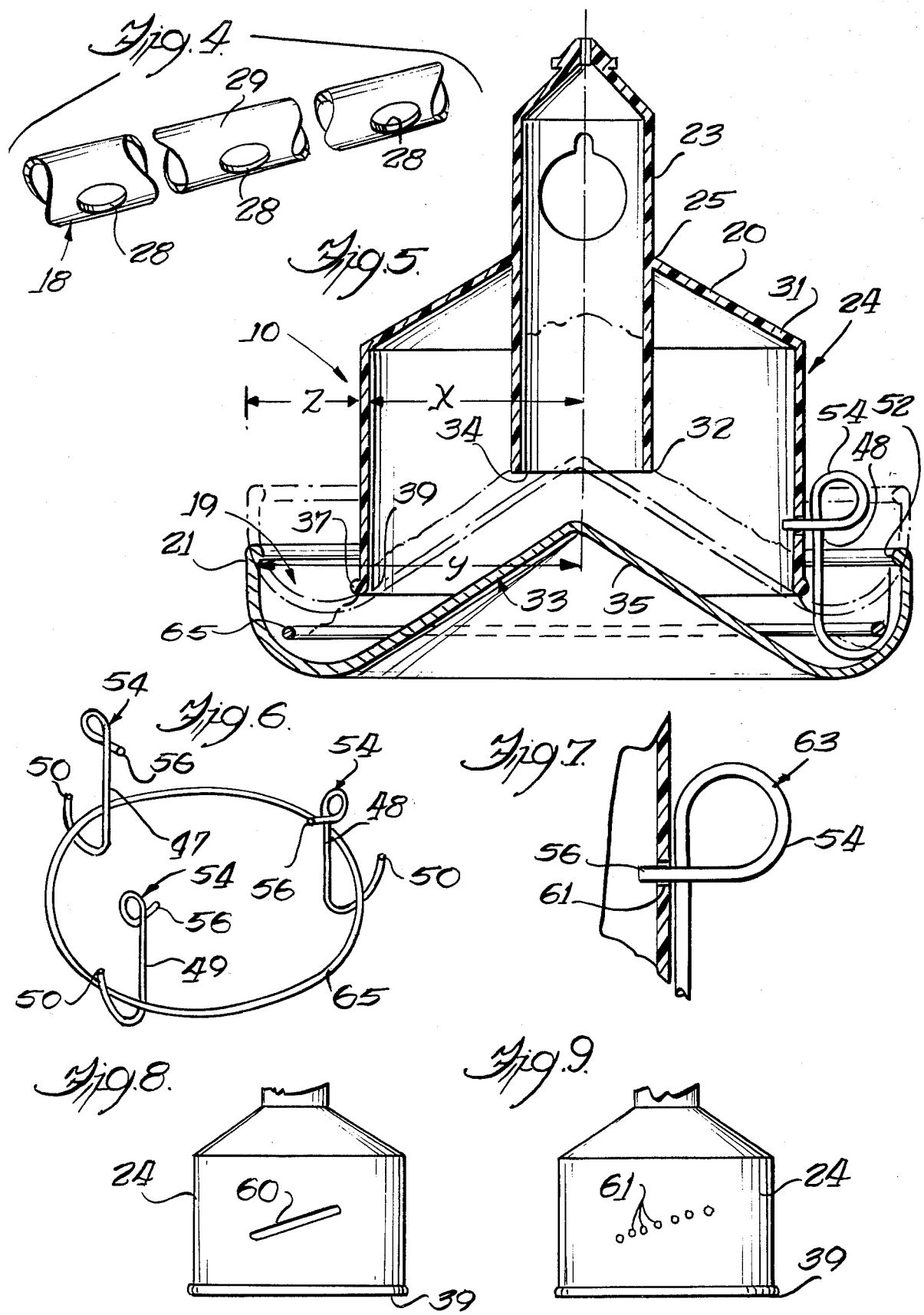

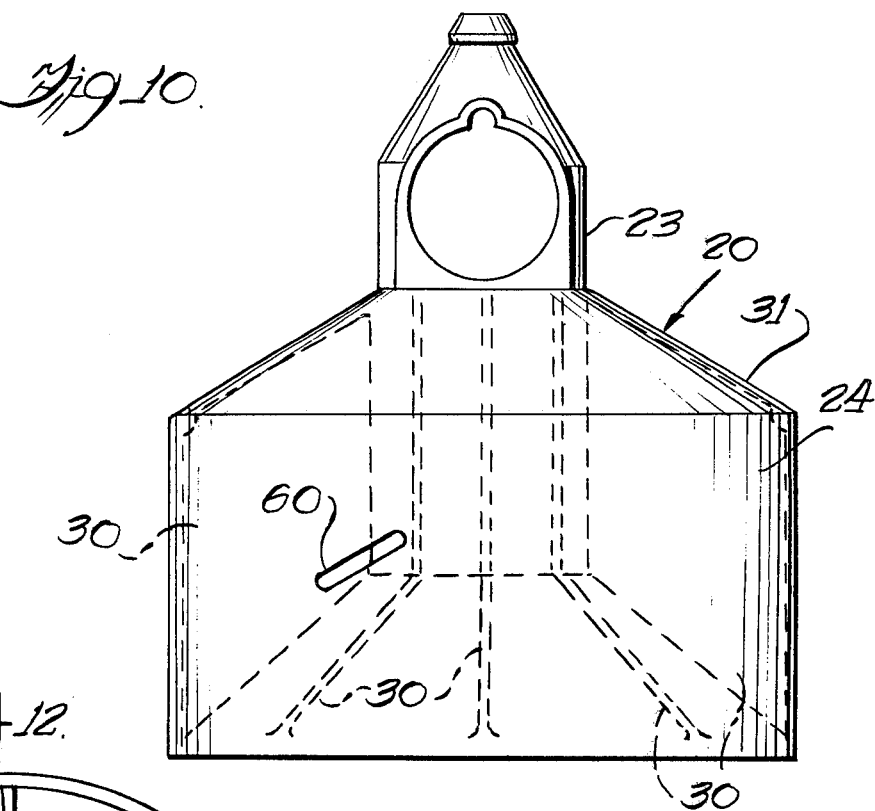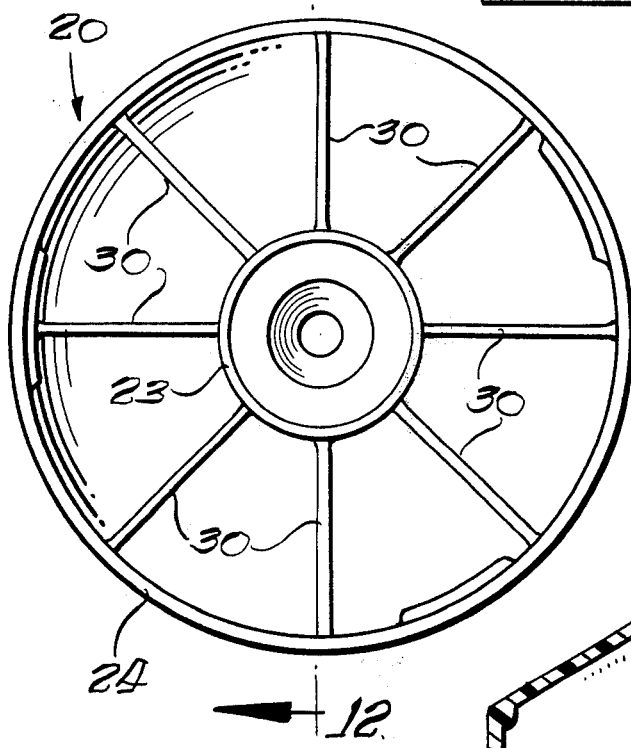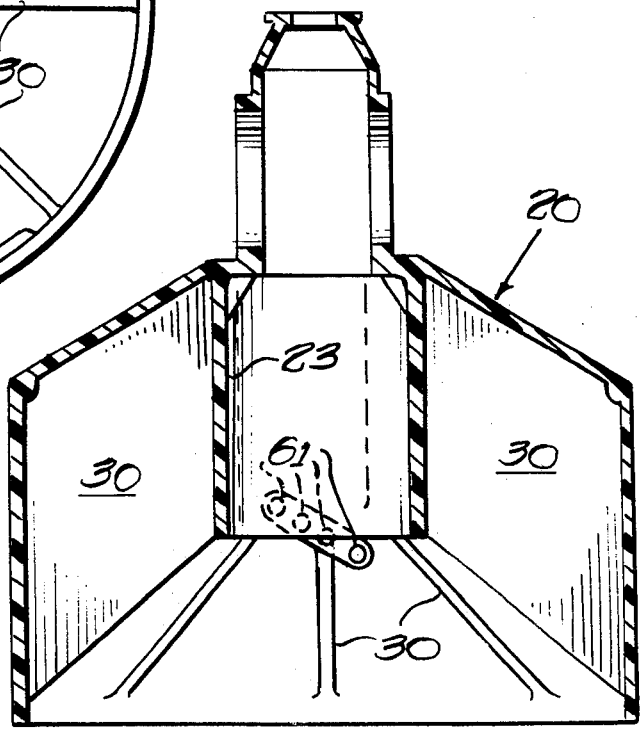

POULTRY FEEDER

REFERENCE TO RELATED APPLICATION

This application is a continuation of U.S. application Ser. No. 378,652 filed on July 12, 1973 and now abandoned.

DESCRIPTION OF THE INVENTION

This invention relates to animal feeding systems, and more particularly relates to feeder pans for poultry and like animals.

Automated feeding systems for poultry and like domestic animals have proved highly successful in modern animal husbandry operations. Such systems can supply carefully proportioned feed mixtures to a large poultry flock with minimum operator effort, thereby permitting the flock to be quickly raised from chicks to mature, commercially valuable birds.

Among the important parts of such automated feeding systems are the feeder pans. These pans receive feed flow from adjacent system mechanisms, and are disposed to afford the birds ready access to measured amounts of feed. Feeder pans which have met with commercial success in such systems are disclosed in U.S. Pat. No. 3,388,690 to Hostetler; U.S. Pat. No. 3,511,215 to Myers; and U.S. Pat. No. 3,230,933 to Myers et al.

In using such automated feeding systems, it has been noted that small birds or chicks occasionally climb bodily into the pan feeding area. While in the feeding area, these animals preclude access to underlying feed by other birds, and the natural waste elimination of birds roosting in the pan may foul the feed and render it undesirable for consumption.

Moreover, feeder pans are often suspended from an associated feed supply conveyor tube. When filled with feed, these pans can stress the conveyor tube and associated parts; if birds roost upon or in the pans, additional weight is imparted to the pan and additional stresses are imparted to the supporting conveyor tube.

Further, if relatively large areas of feed are exposed to consumption, the fowl tend to pick over the feed, selecting the more choice morsels and ingesting an unbalanced diet. Exposure of a limited amount of fresh feed encourages the fowl to eat all the available feed particles.

It is, therefore, the general object of the present invention to provide a feeder pan which permits free access to limited amounts of fresh feed by a large number of fowl, yet which discourages or prevents fowl — even small chicks — from climbing bodily into or on the feeder pan.

More specifically, it is an object to provide a feeder pan which provides an annular feeder area of extended periphery for access by a large number of fowl. An associated object is to provide a feeding area of limited radial or interior extent, thereby preventing fowl from climbing into the feeding area. Another associated object is to provide a feeder pan which does not obstruct access to the feeding area.

It is a further object of the invention to provide a feeder pan which stores and delivers feed in limited amounts, thereby continuously providing a limited amount of fresh feed to a relatively large number of consuming fowl. A related object is to provide a feeder pan which is light in weight even when filled with feed, thereby decreasing strain on associated feed system and conveyor parts.

Yet another object is to provide a feeder pan which discourages animals from picking over the available feed, or leaving elimination therein.

Still another object is to provide a feeder pan at a commercially attractive price to poultry husbandmen or feed system users, and which presents feed in an attractive manner to the consuming poultry.

Other objects and advantages of the invention will become apparent upon reading the following detailed description and upon reference to the drawings. Throughout the description, like reference numerals refer to like parts.

BRIEF DESCRIPTION OF THE DRAWINGS

FIG. 4 is a fragmentary perspective view of the feed system conveyor tube associated with the feeder pan;

FIG. 5 is a sectional view taken substantially in the plane of line 5—5 in FIG. 2 showing in further detail the novel feeder pans;

FIG. 6 is a perspective view of the feed pan and hood interconnecter;

FIG. 7 is a fragmentary sectional view similar to FIG. 5 but showing in further detail the interconnector structure by which the feed pan is attached to the hood member;

FIG. 8 is an elevational view showing the hood member and a pan interconnection aperture;

FIG. 9 is an elevational view similar to FIG. 8 showing the hood and an array of spaced interconnector apertures;

FIG. 10 is an elevational view of the hood; and

FIG. 11 is a bottom view of the hood showing the hood interior, and

FIG. 12 is a sectional view of the hood taken substantially in the plane of line 12—12 in FIG. 11.

DETAILED DESCRIPTION

While the invention will be described in connection with a preferred embodiment, it will be understood that it is not intended to limit the invention to that embodiment. On the contrary, it is intended to cover all alternatives, modifications and equivalents as may be included within the spirit and scope of the invention.

Figure 1:
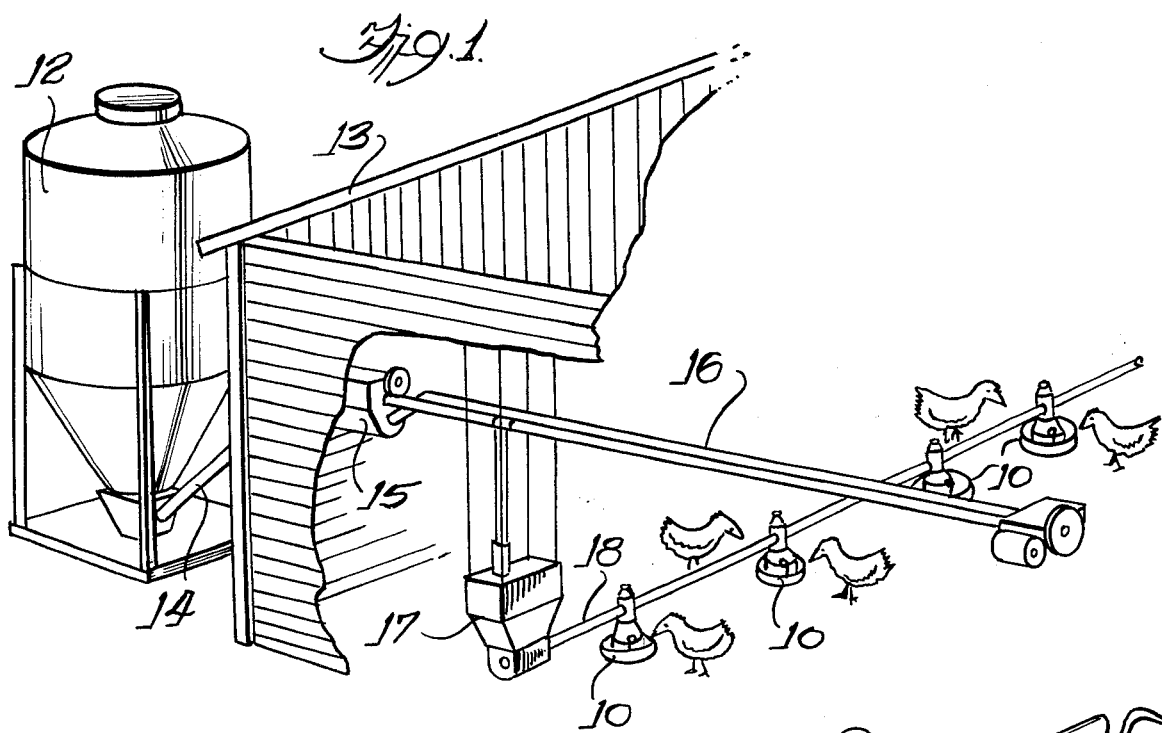
FIG. 1 is a perspective view of a typical poultry feeding system, portions of the view being cut away to show the novel feeder pans as they are used within the system.

Turning first to FIG. 1, there are shown a number of feeder pans 10 of the present invention as they are utilized with a typical feed system. A bulk storage bin 12, which may be located outside a poultry house 13, contains a large quantity of feed; this feed is transported to the interior of the house 13 by a conveyor 14. Various intermediate hoppers 15 and header conveyors 16 transport the feed in a controlled manner to subsidiary hoppers 17 and individual feed-dispensing line conveyors 18.

Figure 2:
FIG. 2 is a perspective view showing a novel feeder pan in its general aspect.

The novel feeder 10 provides a feeding area 19 of extended periphery but limited width or radial dimension. So dimensioned, the feeding area 19 permits free access to limited amounts of fresh feed by large number of fowl and also prevents or discourages the fowl from climbing into the feeding area. In accordance with the invention, therefore, the feeder 10 includes a hood 20 and a pan member 21. In the illustrated embodiment, both the hood 20 and pan member 21 are circular in outer configuration. The hood 20 includes a cylindrical storage pipe 23 which depends from the feed conveyor tube 18 at its upper end, and a shell member 24 which extends outwardly and downwardly from an intermediate point 25 on the storage pipe 23. (As can be envisioned from reference to FIGS. 2 and 4, feed is urged along the conveyor 18 by an auger 27 and is deposited in the storage pipe 23 by delivery through dispensing openings 28 formed within the conveyor tube 29).

The shell member 24 is provided with a first radius X and the pan member 21 is provided with a second radius Y, the difference Z between these two radii constituting an exposed area 19 of extended periphery but limited width or radial extent. The exposed feeding area 19 so formed permits a large number of fowl to obtain access to the feed relative to the size of the pan member 21. The radial extent Z of the feeding area 19 is, however, selected to provide a relatively small width, thereby prohibiting or discouraging even small fowl or chicks from climbing bodily into the feed pan member 21 and roosting therein. Moreover, since the pan 21 is of smooth and unconvoluted cross sectional shape, as shown in FIG. 5, the packing of feed in sharp pan corners and inaccessible pan areas is discouraged. Packed feed can spoil, thereby rendering the remaining feed in the pan unattractive or unsuitable for the fowl.

It is a feature of the invention that the hood parts, including the storage pipe 23 and the shell member 24, can be, if desired, integrally formed of a lightweight, inert, tough material such as plastic; one such material is marketed by the Shell Oil Company as Shell 7521 plastic. Alternatively, lightweight sheet metal of appropriate non-corrosive properties can be used to fabricate the hood in one or more parts. Rigidity is added to the plastic hood structure by a number of ribs 30 extending from the storage pipe 23 to the outer shell member 24. To discourage fowl from roosting elsewhere upon the feeder, the shell member 24 is provided with a sloped, conical top portion 31, the angle of slope of which is sufficiently great to discourage fowl from alighting and roosting thereon.

As also noted above, the feeder 10 is capable of storing a limited amount of feed for dispensation to the consuming fowl. Storage of a small amount of feed permits a rapid turnover of the pan feed supply and insures that the fowl continuously receive fresh feed. In accordance with this aspect of the invention, the storage tube 23 is limited in its interior volume and its cross-sectional area, and it terminates at an edge 32 above the feed pan bottom 33. A first gate 34 is formed by the tube edge 32 and a conical mid-portion 35 of the pan bottom 33, through which feed passes for downward and outward movement. The shell 24 terminates at an edge 37 spaced apart from the storage pipe 23 and the pan 21 to form with the conical pan bottom mid-portion 35 a second gate area 39, through which feed passes for introduction into the feeding area 19. As feed is introduced into the feeding area 19, and the second plate 39 is covered thereby, the introduction of further feed into the feeder 10 results in a feed back-up along the conical mid-portion 35 of the feeder pan to the first gate area 34 and then upwardly in the storage tube 23. When feed storage rises to the level of the dispensing opening 28 in the associated conveyor tube 29, the feed moving along the tube 29 simply bypasses the feeder pan 10, and is moved to a subsequent feeding station for dispensation. A limited amount of feed is thus carried in the feeder pan 10.

Figure 3:
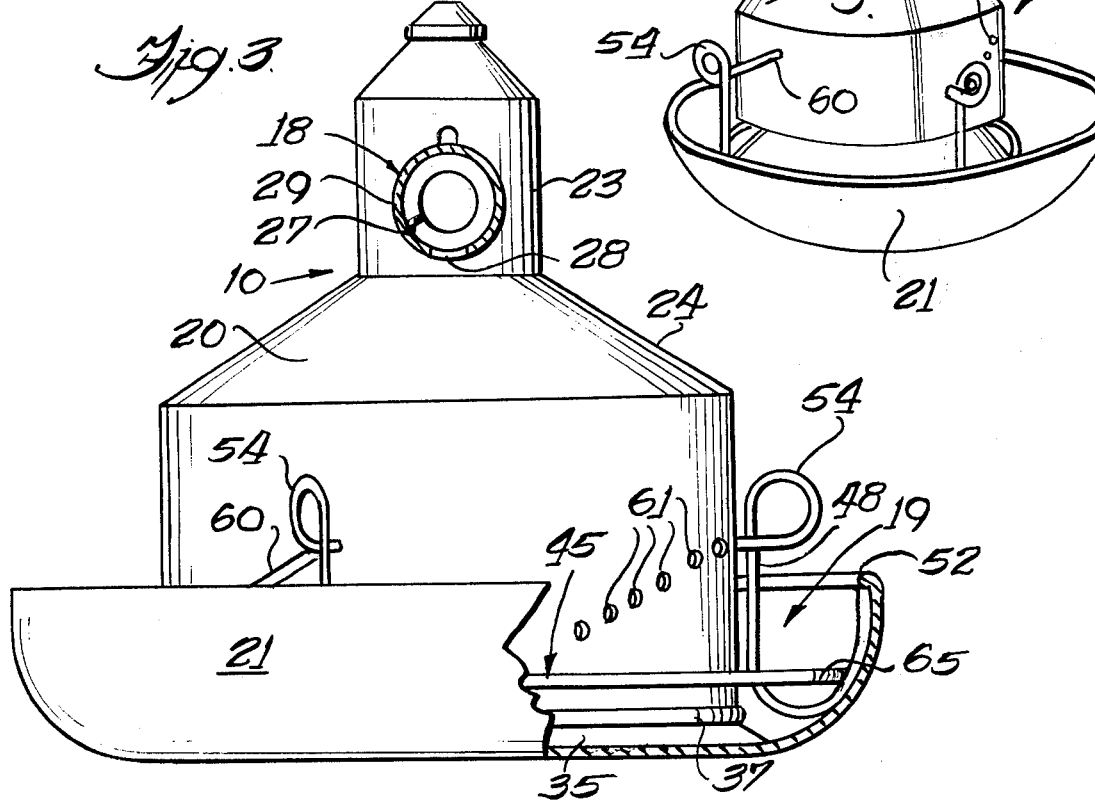
FIG. 3 is an elevational view, partially in section, taken substantially in the plane of line 3—3 in FIG. 2 showing in further detail the novel feeding pan.

In accordance with another aspect of the invention, an interconnecter device 45 is provided for attaching the pan 21 to the hood 20 without obstructing access by the feeding fowl to the feeding area 19. As illustrated in FIGS. 3–9 and elsewhere, this interconnecter device 45 includes a number of struts 47, 48 and 49 which are each provided with an outer end 50 adapted to engage the pan 21 at an undercut or lip portion 52. Each strut 47-49 is formed to extend generally downwardly and inwardly from its outer tip portion 50, and across the interior contours of the pan 21, as shown in FIGS. 3, 5 and elsewhere. Upon reaching the hood 24, each strut 47-49 extends generally upwardly along the outer contours thereof, and terminates at its opposite end in a shell engagement device 54. The engagement device 54 illustrated in FIGS. 2, 3, 5, 7 and elsewhere includes a pin portion 56 which is adapted to be inserted into any one of several apertures which take the form of elongated, diagonally oriented slots 60 or, alternatively, a diagonally oriented array of individual holes 61 (see FIGS. 8 and 9).

Thumb rings 63 or other convenient grasping devices may be attached to or formed on the pins 56 to permit them to be easily withdrawn from the holes 61 and moved to alternate holes; such adjustment serves to adjust the position of the pan 21 relative to the hood 20. When the pan and hood positions are relatively changed, the adjustment changes the relative size of the first gate 34 between the storage tube 23 and the conical pan bottom mid-portion 35, and also changes the size of the second gate 39 formed between the shell 24 and the conical pan bottom mid-portion 35. It will be noted that, in the illustrated embodiment, only that pin 56, which is associated with the array of circular holes 61 need be withdrawn and repositioned. As adjustment motion occurs, the remaining pins 56 simply ride up and down in their associated elongated slots 60, thereby assisting in effectuating a change in the relative positions of the pan 21 and hood 20.

By appropriately locating the holes 61, the pan 21 can be located against the hood 20. When the hood terminal edge 37 and conical pan bottom portion 35 thus abut, the associated feed gate 39 is closed; such a configuration may be useful when a small flock of young chicks are to be fed a reduced feed ration from selected pans only. Moreover, a feed pan so configured can be rested directly upon the floor of the poultry house 13, to provide even very young chicks with access to feed.

It is a feature of the invention that a hoop 65 secures all the struts 47-49 at locations equally spaced about the feeder. To provide free access to the feeding area 19 by the fowl, this hoop 65 follows the general contours of the outer periphery of the pan 21. Moreover, the hoop 65 tends to discourage the fowl from beaking or tossing feed out of the pan by providing a small barrier to the birds' beaks at the periphery of the pan 21. Thus constructed, the interconnecter 45 positively secures the hood 20 and pan 21 in their described relative positions.

The invention is claimed as follows:

1. A feeder for poultry and the like including hood means, pan means having an undercut lip portion, and interconnecter means for suspending the pan means from the hood means, the hood means including a storage pipe member terminating at an edge above the pan member to form a first gate through which feed can pass, and a shell member terminating at an edge above the pan to form a second gate through which feed can pass, the shell member and pan together forming an annular feeding area of extended periphery and sufficient width to permit the poultry to obtain feed from the feeder, but insufficiently wide to permit the poultry to climb bodily into the feeder, the interconnecter means including a plurality of strut members, each member engaging the pan undercut lip portion and extending generally downwardly and inwardly therefrom across the interior contours of the pan and thence upwardly along the outer contours of the shell member, a shell engagement member affixed to each strut member for securing the strut and pan to pre-determined point of the shell member, the interconnection means thereby providing unobstructed access to the feeding area for the poultry.

2. A feeder according to claim 1 wherein said interconnector means includes hoop means securing all the strut means at locations equally spaced about the feeder.

3. A feeder according to claim 2 wherein said hoop means is located adjacent and follows the contours of said pan means, thereby providing unobstructed access to the feeding area for the poultry.

4. A feeder according to claim 2 wherein said hoop means is located adjacent the outer periphery of the pan, thereby discouraging poultry from beaking feed out of the pan.

5. A feeder according to claim 1 wherein each shell engagement member includes a pin adapted for insertion into one or more apertures formed in said shell member and said strut members act to bias said pins into said apertures.

6. A feeder according to claim 5, wherein said shell engagement means includes adjustment means for withdrawing said pin from engagement with a given shell aperture to permit engagement of the shell at an alternate aperture location and effect corresponding simultaneous adjustment of said hood and pan and said first and second gate sizes.

7. A feeder for poultry and the like adapted for use with a feed conveyor, the feeder including hood means and pan means suspended from the hood means, the pan means having a conical bottom portion and an upstanding side portion, and the hood means comprising a storage pipe member adapted to depend from the feed conveyor to receive feed therefrom and to store a limited quantity thereof above the pan means, the pipe member terminating at an edge spaced above the pan means to form with the pan conical bottom portion a first gate through which a limited amount of feed can pass, the hood means further comprising a shell member rigidly connected to the storage pipe member, extending outwardly and downwardly from the storage pipe member, and terminating at an edge spaced apart from the storage pipe member and the pan means to form with the pan conical bottom portion a second gate through which a limited amount of feed can pass, the pipe member terminal edge being fixed in relation to the hood terminal edge and being disposed in relatively close proximity to the apex of the pan conical portion, and the shell member terminal edge being in similar relatively close proximity to the lower area of the pan conical bottom portion and with peripheral radial equidistant spacing from the pipe terminal edge, whereby to provide well-defined and peripherally uniform restricted first and second gate opening areas through which limited amounts of feed can pass and permitting the storage of limited amounts of feed in the feeder, the shell member including a wall spaced apart from and positioned more proximate with respect to the pan side portion than to the apex of the pan conical portion to form a feeding area having an interior of extended periphery and only sufficient width to permit the poultry to obtain feed from the feeder but to prevent feeding poultry from climbing bodily into the feeder.

8. A feeder according to claim 7 including a plurality of rib members rigidly interconnecting said pipe member and said shell member.

9. A feeder according to claim 8 wherein said shell member rigidly interconnected to the pipe member comprises a sloped, conical top portion, having an angle of slope sufficiently great to prevent birds from resting thereon, and a cylindrical substantially vertical wall portion extending from said top shell portion to said shell terminal edge.

10. A feeder according to claim 7 including a rib member extending between said pipe member and said hood member, and wherein said pipe member, said rib member and said shell member are integrally formed as a single piece of plastic.

11. A feeder according to claim 7 wherein said pipe member terminal edge is fixed in relation to said hood terminal edge and each edge is spaced from the pan means by a maximum distance less than the diameter of the pipe member to provide the first and second gates through which limited amounts of feed can pass, thereby permitting the storage of limited amounts of feed in the feeder.

* * * * *